(12) United States Patent  
Go

(10) Patent No.: US 8,108,925 B2  
(45) Date of Patent: Jan. 31, 2012

(54) AUTHENTICATION PRINTING SYSTEM AND AUTHENTICATION PRINTING METHOD

(75) Inventor: Koki Go, Shiojri (JP)

(73) Assignee: Seiko Epson Corporation, Tokyo (JP)

( * ) Notice: Subject to any disclaimer, the term of this patent is extended or adjusted under 35 U.S.C. 154(b) by 1080 days.

(21) Appl. No.: 11/937,582

(22) Filed: Nov. 9, 2007

(65) Prior Publication Data

US 2008/0115207 A1    May 15, 2008

(30) Foreign Application Priority Data

Nov. 10, 2006    (JP) ................................. 2006-305237

(51) Int. Cl.  
*G06F 7/04* (2006.01)  
*G06F 21/00* (2006.01)

(52) U.S. Cl. .......................................... 726/17; 713/182

(58) Field of Classification Search .................... 726/17; 380/247–250; 713/182–186  
See application file for complete search history.

(56) References Cited

U.S. PATENT DOCUMENTS

| | | | | | |
|---|---|---|---|---|---|
| 5,633,932 | A | * | 5/1997 | Davis et al. | 713/176 |
| 5,752,697 | A | * | 5/1998 | Mandel et al. | 271/288 |
| 5,886,634 | A | * | 3/1999 | Muhme | 340/572.1 |
| 6,044,353 | A | * | 3/2000 | Pugliese, III | 705/5 |
| 7,170,625 | B2 | * | 1/2007 | Somei | 358/1.15 |
| 7,389,414 | B2 | * | 6/2008 | Hibino et al. | 713/161 |
| 7,730,526 | B2 | * | 6/2010 | Lamplough | 726/9 |
| 2004/0213612 | A1 | * | 10/2004 | Hanaoka | 400/62 |
| 2005/0120244 | A1 | * | 6/2005 | Choi | 713/201 |
| 2005/0125674 | A1 | * | 6/2005 | Nishiki et al. | 713/182 |
| 2005/0275866 | A1 | * | 12/2005 | Corlett | 358/1.14 |
| 2006/0256364 | A1 | * | 11/2006 | Yamamoto | 358/1.14 |
| 2007/0064269 | A1 | * | 3/2007 | Mokuya et al. | 358/1.15 |
| 2007/0234429 | A1 | * | 10/2007 | Mizutani | 726/26 |
| 2007/0294532 | A1 | * | 12/2007 | Kujirai et al. | 713/170 |

FOREIGN PATENT DOCUMENTS

| | | |
|---|---|---|
| JP | 3034160 B2 | 6/1995 |
| JP | 07-276744 A | 10/1995 |
| JP | 2004-118232 A | 4/2004 |
| JP | 2006-018398 A | 1/2006 |
| JP | 2006-079591 A | 3/2006 |
| JP | 2006-134163 A | 5/2006 |

* cited by examiner

*Primary Examiner* — Nathan Flynn  
*Assistant Examiner* — Abdullah Almamun  
(74) *Attorney, Agent, or Firm* — Sughrue Mion, PLLC

(57) ABSTRACT

An authentication printing system, comprising: an authentication unit that acquires authentication information from a user and authenticates based on the authentication information that the user possesses the authority to execute authentication printing (referred to as "authorized user"); a printing unit that acquires a print job corresponding to the authorized user from a printing job holding unit, and executes the authentication printing based on the print job (referred to as "print execution job"); a re-authentication unit that acquires the authentication information from a user upon completion of print processing, with regard to the print execution job, and authenticates based on the authentication information that the user is the authorized user of the print execution job; and a determination unit that determines that a printed matter is collected by the authorized user with regard to the print execution job, when re-authentication is completed with regard to the print execution job.

9 Claims, 14 Drawing Sheets

HOST APPARATUS 10

HOST APPARATUS 10

AUTHENTICATION PRINT JOB HOLDING SERVER 20

AUTHENTICATION PRINT JOB HOLDING SERVER 20

COLLECTION STATUS MANAGEMENT SERVER 30

COLLECTION STATUS MANAGEMENT SERVER 30

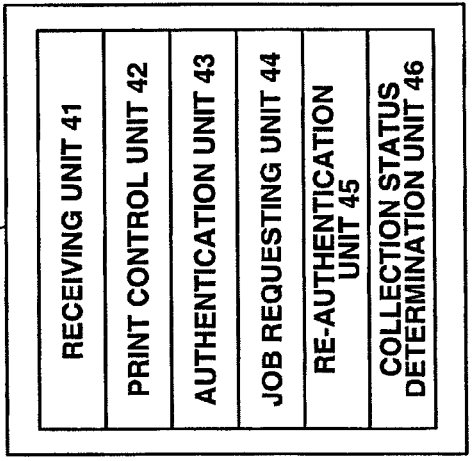
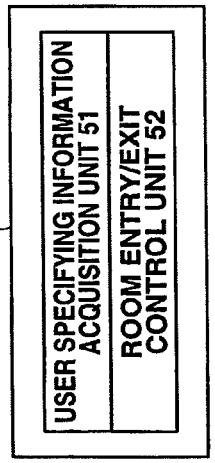
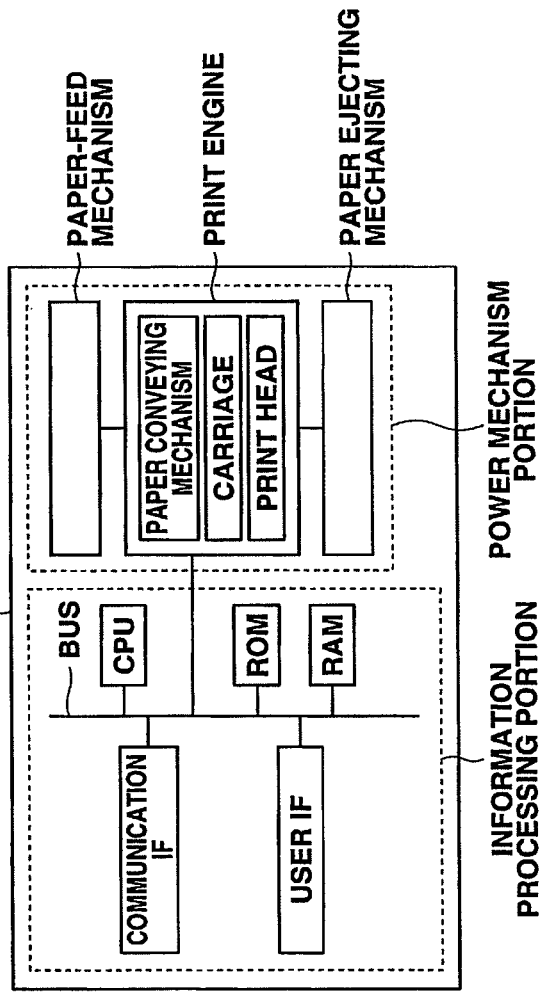
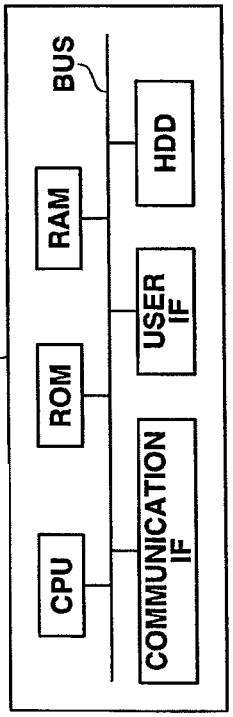

FIG.8

| JOB ID | AUTHORIZED USER SPECIFYING INFORMATION | PRINTER APPARATUS MODEL INFORMATION | JOB-CREATING USER SPECIFYING INFORMATION | DOCUMENT NAME | AUTHENTICATION PRINT JOB STORAGE ADDRESS |
|---|---|---|---|---|---|
| 1 | USER A | LP-xxx | USER A | A. Doc | ********* |
| 2 | USER A | LP-xxx | USER B | B. Doc | ********* |
| 3 | USER X USER Y | LP-xxx | USER X | C. Doc | ********* |

FIG.9A

| JOB ID | AUTHORIZED USER SPECIFYING INFORMATION | COLLECTION STATUS |
|---|---|---|
| 1 | USER A | COLLECTED |
| 2 | USER A | COLLECTED |
| 3 | USER X | COLLECTED |
|   | USER Y | UNCOLLECTED |

FIG.9B

| JOB ID | AUTHORIZED USER SPECIFYING INFORMATION | COLLECTION STATUS | COLLECTION CONFIRMATION CODE |
|---|---|---|---|
| 1 | USER A | COLLECTED | a1234 |
| 2 | USER A | COLLECTED | b5678 |
| 3 | USER X | COLLECTED | c9876 |
|   | USER Y | UNCOLLECTED | d5432 |

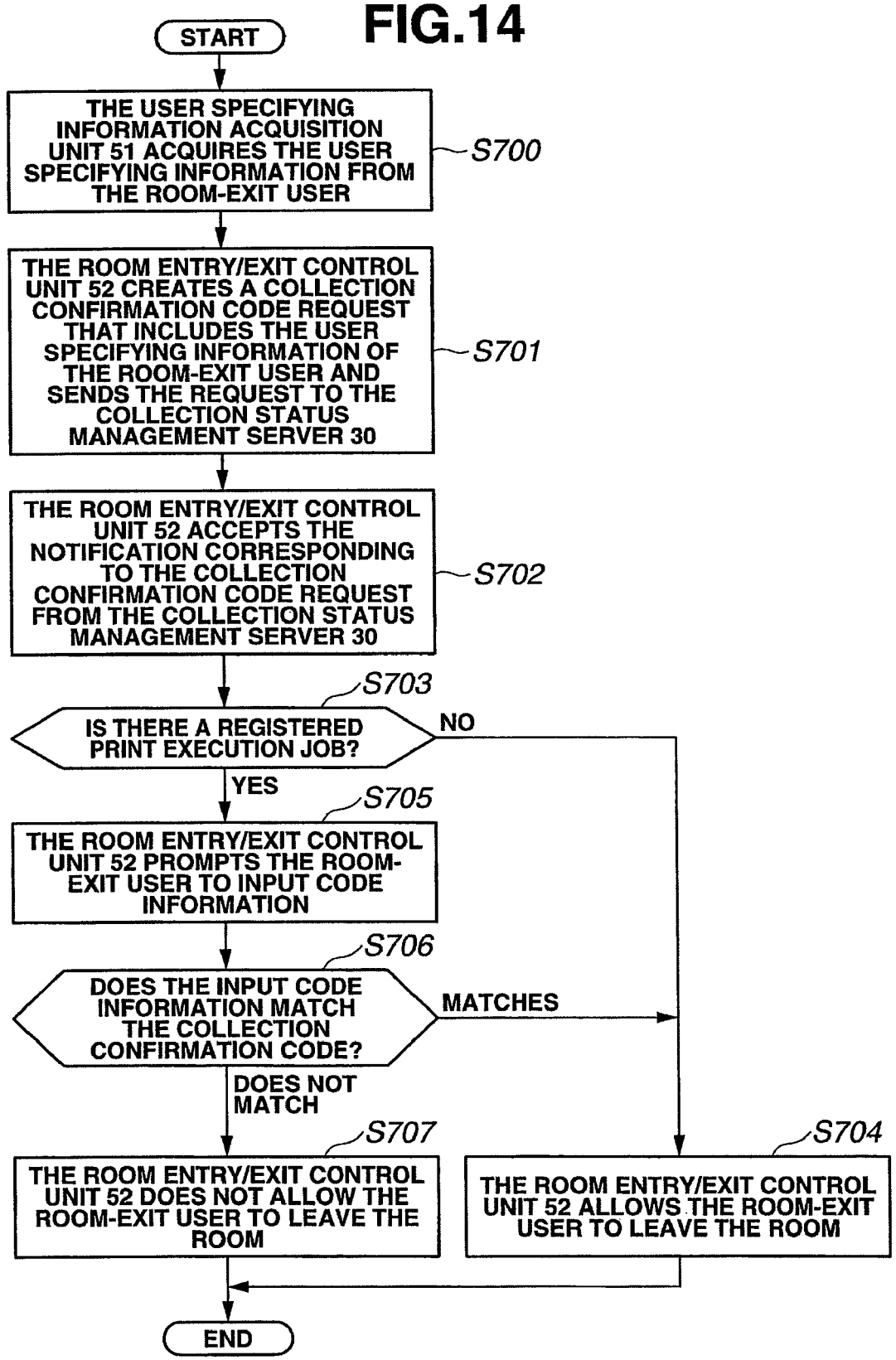

AUTHENTICATION PRINTING SYSTEM AND AUTHENTICATION PRINTING METHOD

The entire disclosure of Japanese Patent Application No. 2006-305237 filed on Nov. 10, 2006 is expressly incorporated by reference herein.

BACKGROUND

1. Technical Field

The present invention relates to authentication printing for executing printing under the condition that authentication has been carried out.

2. Related Art

There has long been known an authentication printing system that prevents information leakage and the like by permitting only a person, who has been subjected to authentication using an authentication device, to perform printing. Japanese Patent Publication No. 3034160, for example, disposes a configuration in which, when printing a confidential document, the image data that is generated based on the print data is stored in the printing apparatus and printing is executed based on the image data under the condition that user authentication has been carried out, instead of printing the document immediately in response to a print instruction. Furthermore, JP-A-2004-118232 discloses a configuration in which the print data for authentication printing are accumulated in a server beforehand and, when authentication information is transmitted from a printer the relevant print data is transmitted to the printer.

In authentication printing, print processing is carried out once user authentication is completed, hence it is assured at the start of the print processing that the user who has been authorized to duly execute the authentication printing (referred to as "authorized user" hereinafter) is present in a print execution location (in the vicinity of a printing apparatus or an authentication apparatus).

In the previous authentication printing system, however, once the user authentication is completed and the print processing is started, the print processing is continued even if the authorized user is not present in the print execution location. Consequently, it is possible that, after the print processing, a printed matter is left untouched without being collected for a long time in the absence of the authorized user. Other people might see the left printed matters, thus the confidentiality intended in the authentication printing might not be ensured sufficiently.

Therefore, in order to ensure the confidentiality to enhance the effectiveness of the authentication printing, it is important that the authorized user, who has executed the authentication printing, confirm whether the printed matter is collected or not upon completion of the print processing.

SUMMARY

An advantage of some aspects of the invention is to provide a new framework for authentication printing, which is capable of determining whether a printed matter for authentication printing is collected by an authorized user upon completion of the print processing and appropriately confirming the collection status.

An authentication printing system of the present invention comprises: an authentication unit that acquires authentication information from a user and authenticates based on the authentication information that the user possesses the authority to execute authentication printing (hereinafter, the user who possesses the above authority is referred to as "authorized user"); a printing unit that acquires a print job corresponding to the authorized user from a printing job holding unit for storing the print job in association with the user, and executes the authentication printing based on the print job (hereinafter, a print job subjected to such authentication printing is referred to as "print execution job"); a re-authentication unit that acquires the authentication information from a user upon completion of print processing, with regard to the print execution job, and authenticates based on the authentication information that the user is the authorized user of the print execution job; and a collection status determination unit that determines that a printed matter is collected by the authorized user with regard to the print execution job, when authentication is completed by the re-authentication unit with regard to the print execution job.

According to such a configuration, the authorized user who has performed authentication printing can be strongly reminded, at the time of re-authentication, that there is a printed matter to be collected, and as a result the authorized user can be prevented from forgetting to collect the printed matter and the confidentiality of the printed matter can be ensured precisely.

Preferably, the authentication printing system comprises a room exit control unit that gives room exit permission to a user, who wishes to exit from a room in which is set up a printing apparatus for executing the authentication printing and an apparatus for acquiring the authentication information (hereinafter, the user who wishes to exit from the room is referred to as "the room-exit user"), on condition that determination is made that the printed matter, which is obtained as a result of the print execution job regarding which the room-exit user possesses the authority to execute authentication printing is collected.

More preferably, when the collection status determination unit determines that the printed matter obtained as a result of the print execution job is collected, the collection status determination unit writes a status indicating printed matter collection into a storage medium for the authorized user of the print execution job, and the room exit control unit permits the user to exit from the room when the room exit control unit reads the status indicating printed matter collection from the storage medium for the room-exit user.

The authentication printing system of the present invention comprises: an authentication unit that acquires authentication information from a user and authenticates based on the authentication information that the user possesses the authority to execute authentication printing (hereinafter, the user who possesses the above authority is referred to as "authorized user"); a printing unit that acquires a print job corresponding to the authorized user from a printing job holding unit for storing the print job in association with the user, and executes the authentication printing based on the print job; a code presentation unit that creates a code for performing collection confirmation (collection confirmation code) with respect to the print job that is subjected to the authentication printing, and presents the collection confirmation code upon completion of the printing; and a collection status determination unit that acquires code information from a user and, when the acquired code information matches the collection confirmation code of the print job that is subjected to the authentication printing by the user as the authorized user, determines that a printed matter corresponding to the print job is collected by the authorized user.

According to such a configuration, the authorized user who has performed print processing based on the authentication print job can be strongly reminded, at the time of checking the collection confirmation code, that there is a printed matter to be collected, and as a result the authorized user can be prevented from forgetting to collect the printed matter and the confidentiality of the printed matter can be ensured precisely.

Preferably, the authentication printing system comprises a room exit control unit that gives room exit permission to a user, who wishes to exit from a room in which is set up a printing apparatus for executing the authentication printing and an apparatus for acquiring the authentication information (hereinafter, the user who wishes to exit from the room is referred to as "the room-exit user"), on condition that determination is made that the printed matter, which is obtained as a result of the print job subjected to the authentication printing by the room-exit user as the authorized user, is collected.

More preferably, the code presentation unit includes a unit that displays the collection confirmation code on a predetermined display portion upon completion of printing, or a unit that prints the collection confirmation code on the last page of the printed matter.

An authentication printing method of the present invention comprises: an authentication step of acquiring authentication information from a user and authenticating based on the authentication information that the user possesses the authority to execute authentication printing (hereinafter, the user who possesses the above authority is referred to as "authorized user"); a printing step of acquiring a print job corresponding to the authorized user from a printing job holding unit for storing the print job in association with the user, and executing the authentication printing based on the print job (hereinafter, a print job subjected to such authentication printing is referred to as "print execution job"); a re-authentication step of acquiring the authentication information from a user upon completion of print processing, with regard to the print execution job, and authenticating based on the authentication information that the user is the authorized user of the print execution job; and a collection status determination step of determining that a printed matter is collected by the authorized user with regard to the print execution job, when authentication is completed as a result of authentication executed in the re-authentication step with regard to the print execution job.

The authentication printing method of the present invention comprises: an authentication step of acquiring authentication information from a user and authenticating based on the authentication information that the user possesses the authority to execute authentication printing (hereinafter, the user who possesses the above authority is referred to as "authorized user"); a printing step of acquiring a print job corresponding to the authorized user from a printing job holding unit for storing the print job in association with the user, and executing the authentication printing based on the print job; a code presentation step of creating a code for performing collection confirmation (collection confirmation code) with respect to the print job that is subjected to the authentication printing, and presenting the collection confirmation code upon completion of the printing; and a collection status determination step of acquiring code information from a user and, when the acquired code information matches the collection confirmation code of the print job that is subjected to the authentication printing by the user as the authorized user, determining that a printed matter corresponding to the print job is collected by the authorized user.

The authentication printing method of the present invention can be implemented by a printing apparatus or an information processing apparatus, and a program for implementing the authentication printing method can be installed or loaded through various media, such as a CD-ROM, a magnetic disk, a semiconductor memory and a communication network. Also, the program might be recorded in a printer card or a printer option board and distributed.

The present invention can provide a new framework for authentication printing, which is capable of determining whether a printed matter for authentication printing is collected by an authorized user upon completion of the print processing and appropriately confirming the collection status.

BRIEF DESCRIPTION OF THE DRAWINGS

FIG. 3A-3D are block diagrams showing a configuration of a printer apparatus 40 and a room entry/exit management apparatus 50;

FIG. 8 is a diagram showing an example of a data structure of an authentication print job accumulation unit 21;

FIGS. 9A and 9B are diagrams showing an example of a data structure of a collection status storage unit 31;

FIG. 14 is a flowchart for explaining the operation of the room entry/exit management apparatus 50 according to a modified example of the second embodiment.

DESCRIPTION OF EXEMPLARY EMBODIMENTS

First Embodiment

Figure 1:
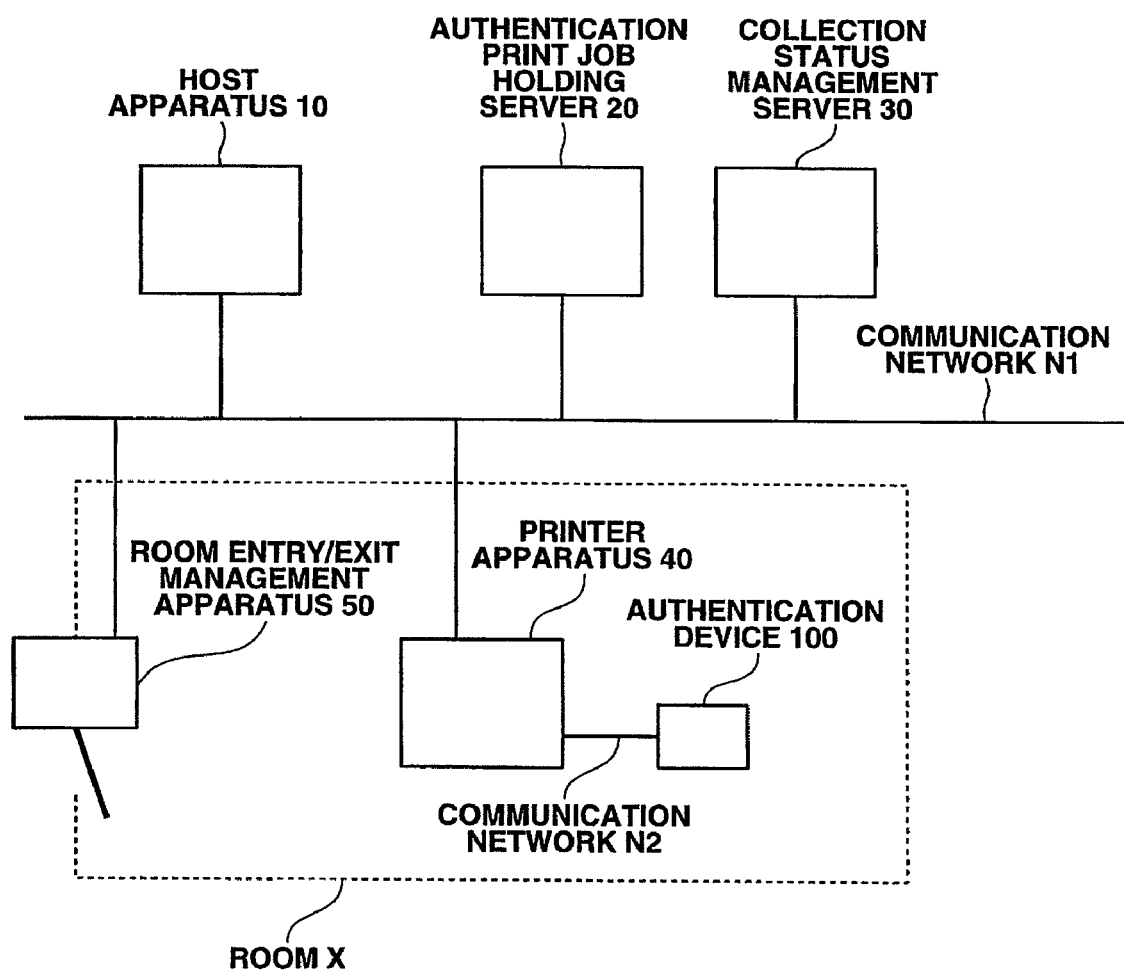
FIG. 1 is a block diagram showing a schematic configuration of an authentication printing system 1.

FIG. 1 is a block diagram showing a schematic configuration of an authentication printing system 1 according to an embodiment of the present invention. As shown in FIG. 1, the authentication printing system 1 comprises a host apparatus 10, an authentication print job holding server 20, a collection status management server 30, a printer apparatus 40, an authentication device 100, and a room entry/exit management apparatus 50, and the printer apparatus 40 that executes authentication printing and the authentication device 100 that acquires authentication information are set up in a room X where entry and exit are managed by the room entry/exit management apparatus 50.

The host apparatus 10, the authentication print job holding server 20, the collection status management server 30, and the printer apparatus 40 are configured so as to be able to communicate with one another via a communication network N1.

The authentication device 100 is configured so as to be able to communicate with the printer apparatus 40 via a communication network N2. The communication network N1 and N2 may be a LAN, the Internet, a dedicated line, a packet communication network, or a combination thereof and either or both wired and wireless forms can be adopted. Furthermore, the communication network N2 may be a device connection interface, such as a USB.

Although FIG. 1 shows one each of the host apparatus 10, the authentication print job holding server 20, the collection status management server 30, the printer apparatus 40, the authentication device 100, and the room entry/exit management apparatus 50, the authentication printing system 1 may be configured with one or more of these components according to the design.

Figure 2A:
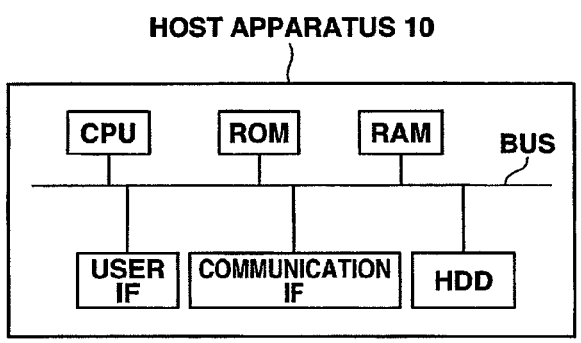
FIG. 2A-2F are block diagrams showing a configuration of a host apparatus 10, an authentication print job holding server 20, and a collection status management server 30.

The host apparatus 10 is constituted by hardware, such as a CPU (processor), a ROM, a RAM, a user interface, a communication interface, HDD and the like, wherein the CPU is configured so as to be able to access each unit via a bus (see FIG. 2A).

Figure 2B:
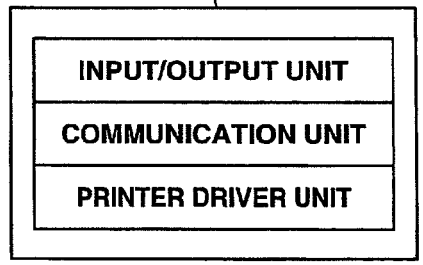

The host apparatus 10 has the same function as an information processing apparatus such as a regular personal computer. For example, the host apparatus 10 includes an input/output unit 11 that accepts various inputs from a user and outputs information to a user via the user interface, a communication unit 12 that sends and receives various data to and from the other apparatuses via the communication interface, and a printer driver unit 13 that controls the printer apparatus (see FIG. 2B). Each of these units is functionally realized as a result of the CPU executing a program stored in, for example, the ROM, RAM or HDD within the host device 10 or an external storage medium or the like.

The printer driver unit 13 supports authentication printing performed by the authentication print job holding server 20 and the printer apparatus 40 and, as with a regular printer driver, has a function for creating a print job in a form that the corresponding printer apparatus can perform print processing. For example, when a request for authentication printing is issued from an application program or the like operated on the host apparatus 10, a print job for the authentication printing (authentication print job) is created and then transmitted to the authentication print job holding server 20.

Figure 2C:
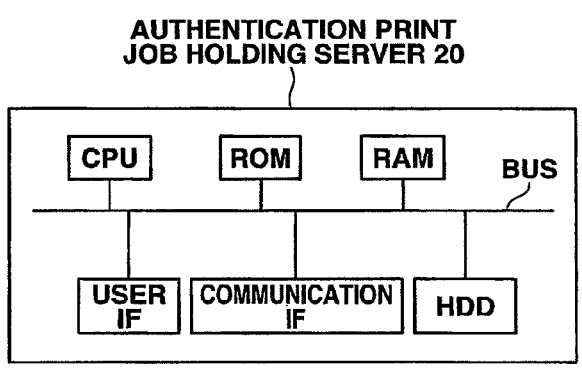

The authentication print job holding server 20 is constituted by hardware, such as a CPU (processor), a ROM, a RAM, a user interface, a communication interface, HDD and the like, wherein the CPU is configured so as to be able to access each unit via a bus (see FIG. 2C).

Figure 2D:
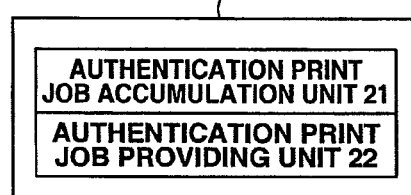

As with a regular authentication print server, the authentication print job holding server 20 includes: an authentication print job accumulation unit 21 that stores an authentication print job transmitted from the host apparatus 10 associated with an authentication printing execution authority possessing user (authorized user) of the authentication print job; and an authentication print job providing unit 22 that, based on an authentication print job request accepted from the printer apparatus 40, transmits a corresponding authentication print job to the printer apparatus 40 (see FIG. 2D). Each of these units is functionally realized as a result of the CPU executing a program stored in, for example, the ROM, RAM or HDD within the authentication print job holding server 20 or an external storage medium or the like.

It should be noted that the authentication print job holding server 20 itself or the authentication print job accumulation unit 21 can be taken as a print job holding unit.

Figure 2E:
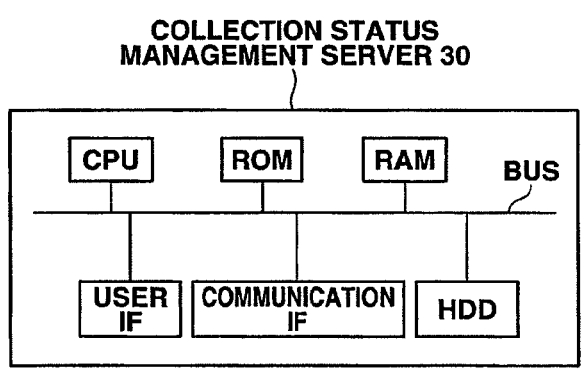

The collection status management server 30 is constituted by hardware, such as a CPU (processor), a ROM, a RAM, a user interface, a communication interface, HDD and the like, wherein the CPU is configured so as to be able to access each unit via a bus (see FIG. 2E).

Figure 2F:
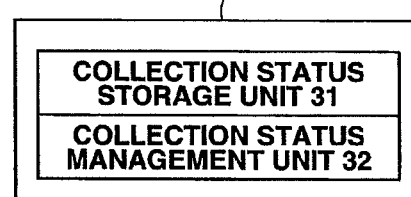

The collection status management server 30 includes: a function for managing a collection status of a printed matter that is printed based on the authentication print job by the printer apparatus 40, the function being a collection status storage unit 31 that stores user specifying information on the authorized user corresponding to the authentication print job and a collection status of a printed matter obtained by the authorized user, in association with identification information of the authentication print job; and a collection status management unit 32 that refers to the collection status storage unit 31 to update the collection status on the basis of the information from the printer apparatus 40, send thus obtained collection status in response to an inquiry sent from the room entry/exit management apparatus 50, or executes other processing related to the collection status (see FIG. 2F). Each of these units is functionally realized as a result of the CPU executing a program stored in, for example, the ROM, RAM or HDD within the authentication print job holding server 20 or an external storage medium or the like.

The printer apparatus 40 has the same configuration as a regular printer apparatus (see FIG. 3A).

For example, the printer apparatus 40 includes a power mechanism portion that is constituted by a paper-feed mechanism for feeding a paper into the printer apparatus, a print engine that performs printing, and a paper ejection mechanism that ejects the paper to the outside of the printer apparatus. The print engine is normally constituted a paper conveying mechanism, a carriage mechanism, a print head and the like. A wide variety of print engines can be used for a serial printer such as an inkjet printer or a thermal transfer printer for printing character-by-character, a line printer for printing a line at a time, and a page printer for printing a page at a time.

Moreover, for example, the printer apparatus 40 includes an information processing portion that is constituted by a CPU, a ROM, a RAM, a communication interface, a user interface such as a console panel and the like. The CPU of the printer apparatus 40 is configured so as to be able to each portion via a bus, and is caused to control the power mechanism portion to actually perform printing operation on the basis of print data that is sent via, for example, the communication interface.

The function of the information processing portion of the printer apparatus 40 is, in principle, the same as the function of the information processing portion of an existing printer apparatus. For example, the information processing portion includes: a receiving unit 41 that receives a print job; and a print control unit 42 that analyzes the print job, generates one band or one page of print image in a raster format, stores the generated print image in an image buffer, transfers a predetermined unit (one pass, for example) of the print image from the image buffer to the print engine, and executes printing while controlling the print engine.

The information processing portion also has function serving as an authentication printing apparatus, that is, includes an authentication unit 43 that uses the authentication device 100 to acquire authentication information from a user who wishes to execute authentication printing, and authenticates based on the authentication information that the user is the authorized user, a job requesting unit 44 that requests the authentication print job holding server 20 for an authentication print job corresponding to job specifying information acquired from the authorized user and the like (see FIG. 3B).

However, the information processing portion of the printer apparatus 40 of the present embodiment differs from that of the past authentication printing apparatus in that the information processing portion according to the present embodiment further includes, as shown in FIG. 3B: a re-authentication unit 45 that acquires the authentication information from a user upon completion of print processing, with regard to the authentication print job that is subjected to the authentication printing, and authenticates based on the authentication information that the user is the authorized user of the authentication print job; and a collection status determination unit 46 that determines that a printed matter is collected by the authorized user with regard to the authentication print job when authentication is completed by the re-authentication unit 45, and notifies the collection status management server 30 of the result of determination.

Each of these units is functionally realized as a result of the CPU executing a program stored in, for example, the ROM, RAM or HDD within the authentication print job holding server 20 or an external storage medium or the like.

The authentication device 100 is, for example, a magnetic card reader, a fingerprint reader, a bar-code reader or the like, and a variety of existing authentication devices can be used according to the design.

The room entry/exit management apparatus 50 is constituted by hardware, such as a CPU (processor), a ROM, a RAM, a user interface, a communication interface, HDD and the like, wherein the CPU is configured so as to be able to access each unit via a bus (see FIG. 3C).

The room entry/exit management apparatus 50 has the same functions as an orthodox entry/exit management apparatus, that is, for example, includes a user specifying information acquisition unit 51 that acquires user specifying information on the user who tries to enter the room X or who tries to leave the room X, and a room entry/exit control unit 52 that determines based on the acquired user specifying information whether the user can enter or leave the room, and, for example, locks/unlocks a door for entering or leaving the room X, in response to the result of determination (see FIG. 3D).

However, the room entry/exit control unit 52 of the present embodiment differs from the existing configuration in that the room entry/exit control unit 52 has, as shown in FIG. 3D, a collection status confirmation function that inquires of the collection status management server 30 for the collection status of the printed matter obtained as a result of authentication printing, with regard to the user who tries to leave the room X, and determines based on the result of the inquiry whether or not the user is allowed to leave the room.

Hereinafter, the framework for authentication printing performed in the authentication printing system 1 is described with reference to the flowcharts shown in FIG. 4 through FIG. 7. It should be noted in the present specification that the steps shown in the flowcharts (including some steps without reference numerals) can be executed in parallel or by optionally changing the order of the steps within the scope which does not cause any inconsistencies.

Figure 4:
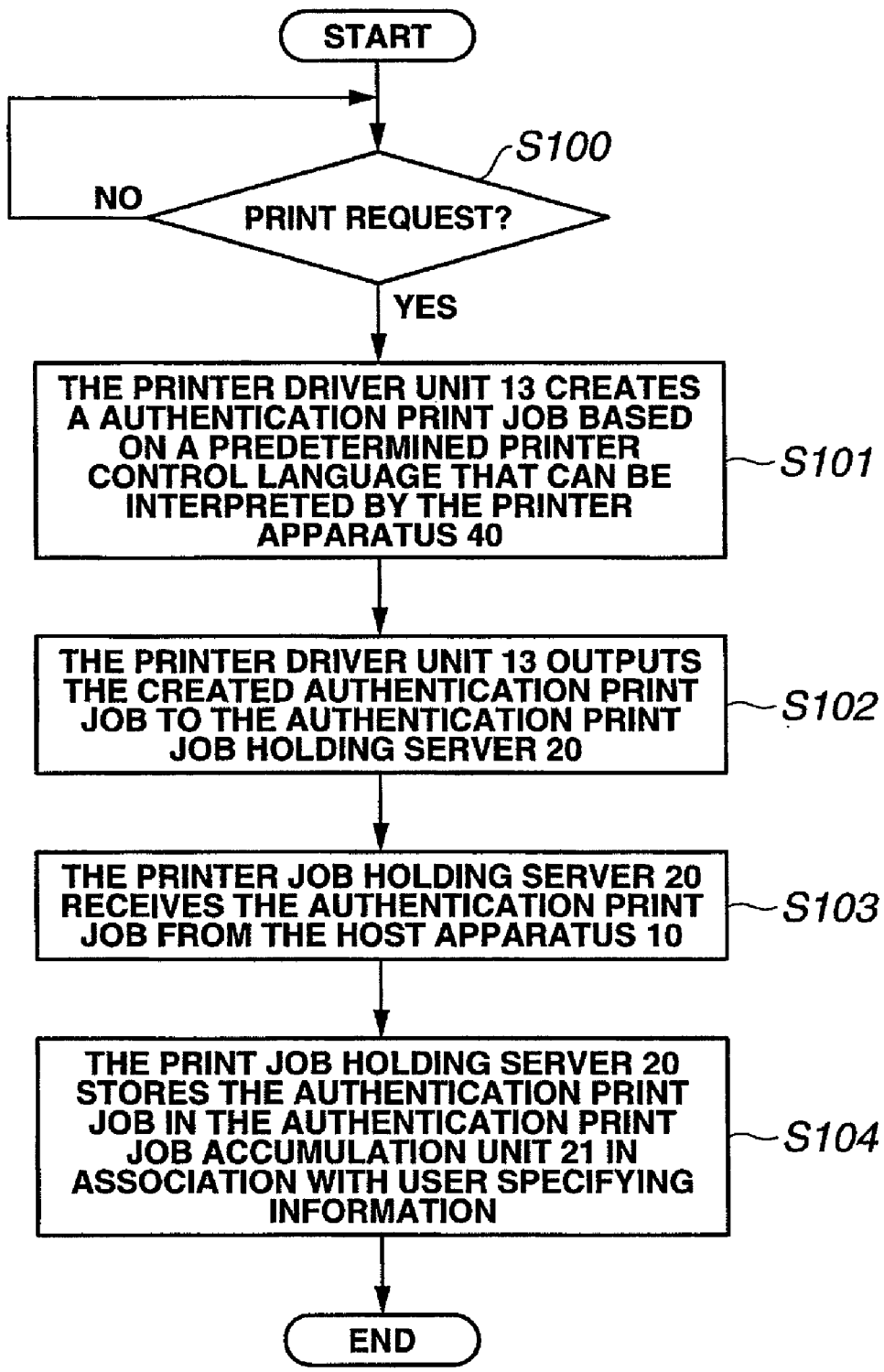
FIG. 4 is a flowchart for explaining the steps of accumulating authentication print jobs.

Steps of Accumulating Authentication Print Jobs: FIG. 4

Once the printer driver unit 13 of the host apparatus 10 accepts a print request designating the printer apparatus 40 from the application program or the like that is operated on the external or host apparatus 10 (S100), the printer driver 13 creates an authentication print job on the basis of a printer control language that can be interpreted by the printer apparatus 40 (S101), and outputs the authentication print job to the authentication print job holding server 20 (S102).

The authentication print job can include, for example, a job ID, information on the model of an output destination printer, user specifying information on a job-creating user, user specifying information on the authorized user, a document name, print setting information, and other information. The authorized user may be different from the job-creating user, or a plurality of authorized users may be designated using a single authentication print job.

Once the authentication print job holding server 20 receives the authentication print job from the host apparatus 10 (printer driver unit 13) (S103), the authentication print job holding server 20 extracts the user specifying information of the authorized user and the like from this authentication print job, and stores the authentication print job in the authentication print job accumulation unit 21 in association with the extracted information (S104). FIG. 8 shows an example of a data structure of the authentication print job accumulation unit 21.

Figure 5:
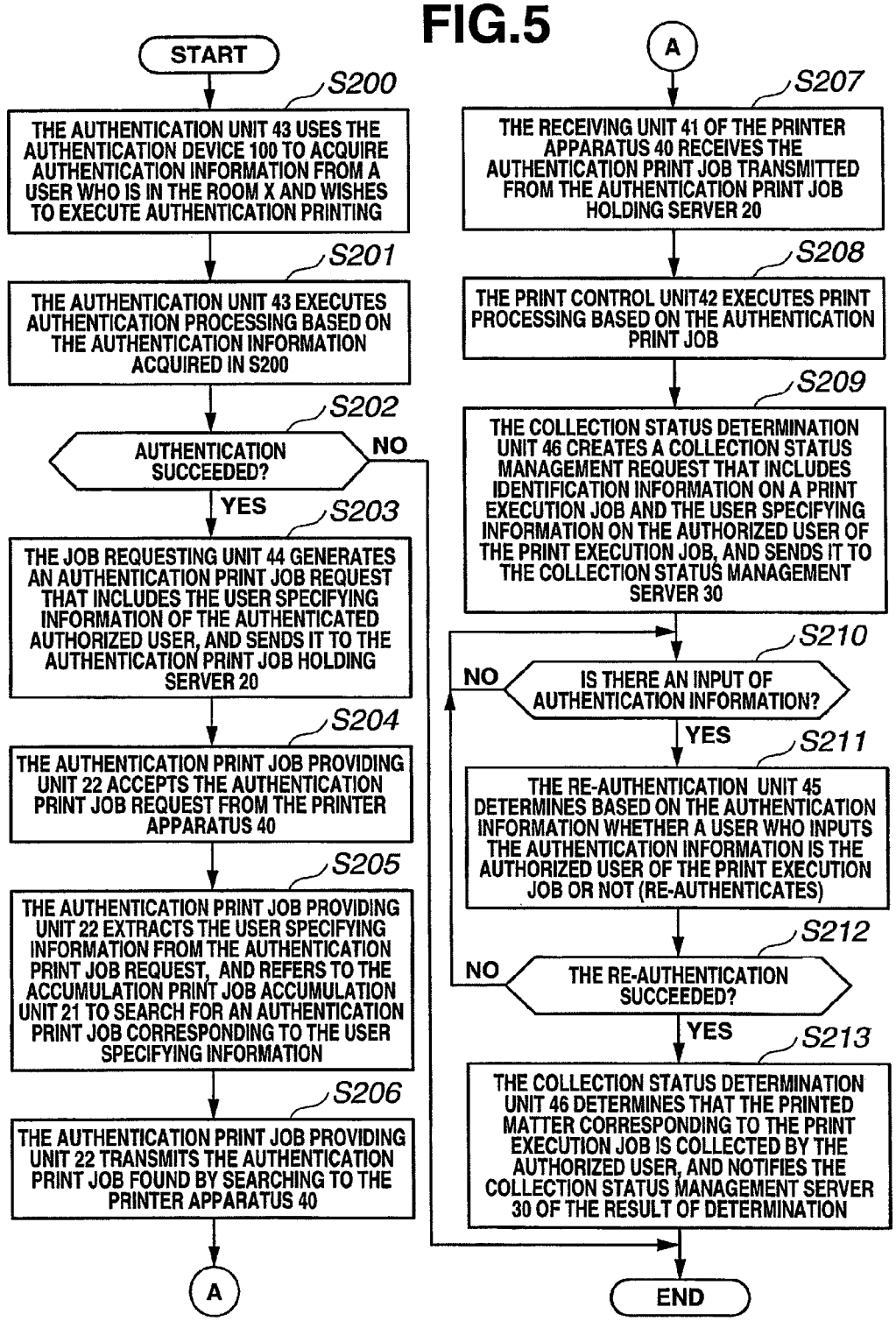
FIG. 5 is a flowchart for explaining the steps of executing authentication printing.
Figure 6:
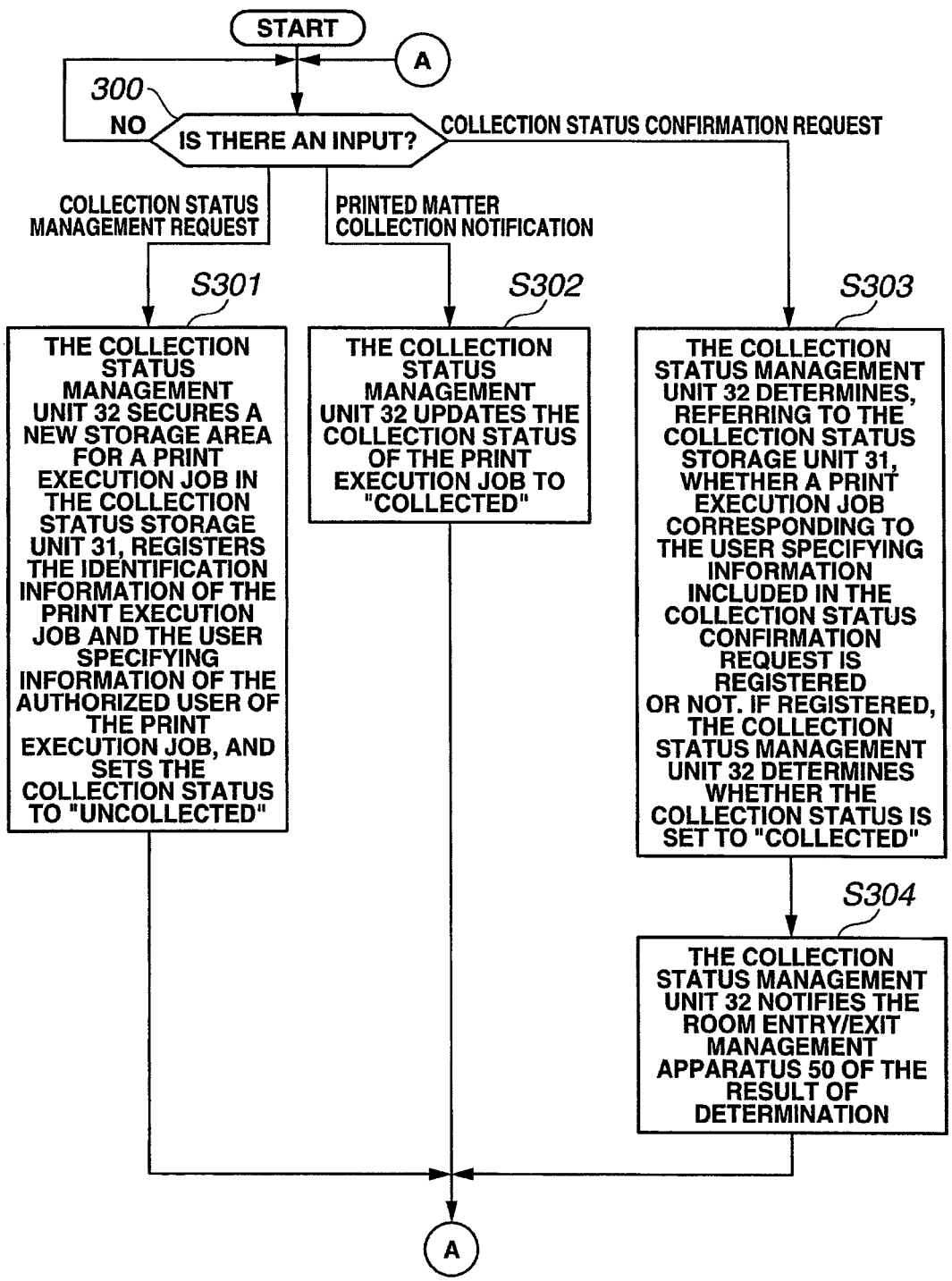
FIG. 6 is a flowchart for explaining the operation of the collection status management server 30.
Figure 7:
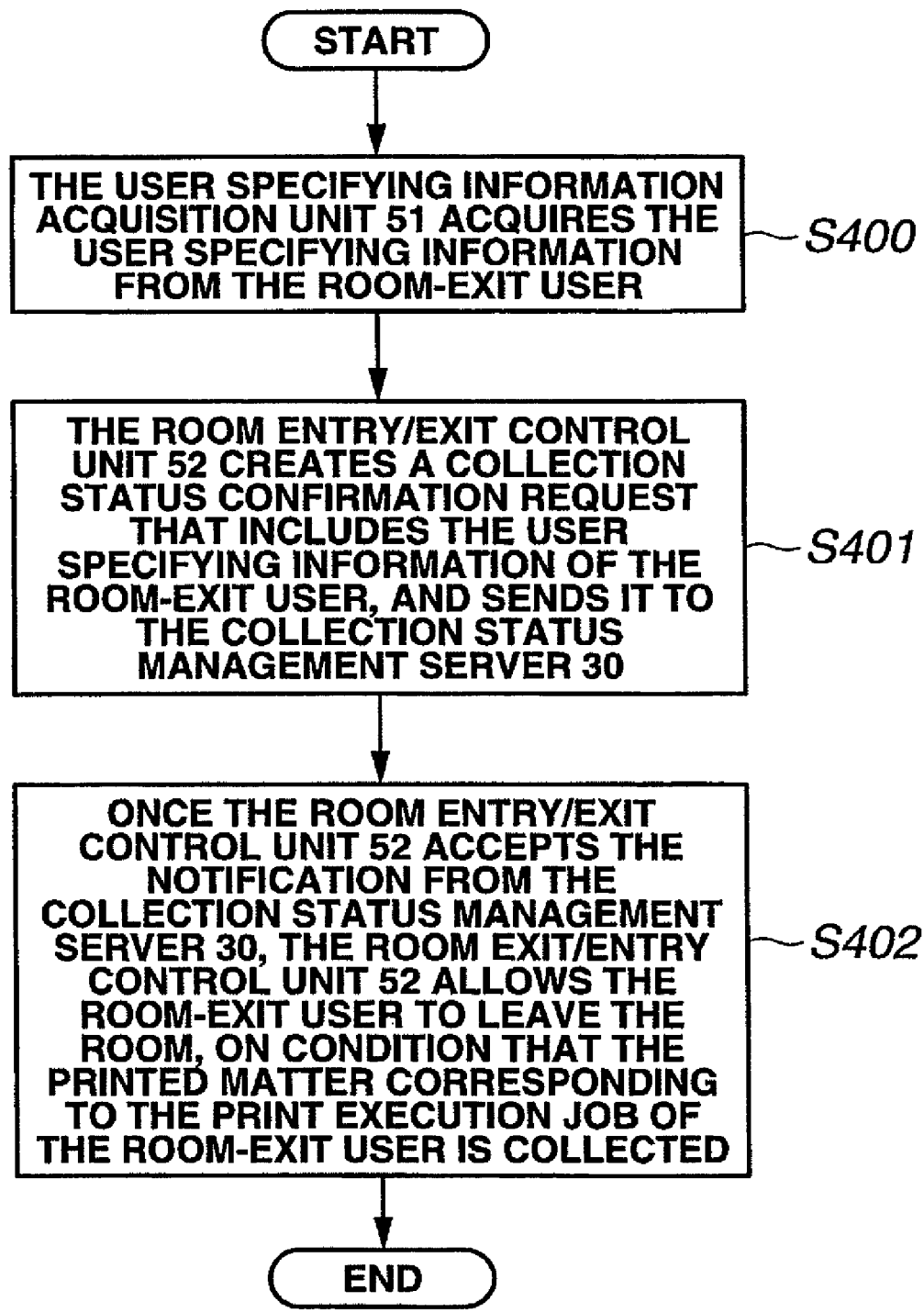
FIG. 7 is a flowchart for explaining the operation of the room entry/exit management apparatus 50.

Steps of Executing Authentication Printing: FIG. 5 through FIG. 7

Authentication print processing using the printer apparatus 40 is executed in the following procedures.

First, the authentication unit 43 uses the authentication device 100 to acquire information required for user authentication (authentication information) from a user who wishes to stay in the room X and execute authentication printing (S200).

For example, if the authentication device 100 is a magnetic card reader, the authentication unit 43 acquires, as the authentication information, the identification information that is recorded in an ID card or the like that is swiped through the magnetic card reader by the user who wishes to perform printing. What kind of information to use as the authentication information can be defined based on the design, but, for example, the user name, the user ID (staff number, etc) or the like can be used.

Next, the authentication unit 43 determines whether the user who input the authentication information is the authorized user or not on the basis of the authentication information acquired in S200 (authentication processing is executed) (S201).

For example, when the authentication unit 43 is a client of an LDAP authentication service, it is considered that the authentication unit 43 sends the acquired authentication information to a directory server (not shown) providing the LDAP authentication service, receives the result of authentication performed by the directory server based on the authentication information, and performs determination.

If the user who has input the authentication information is not authenticated as the authorized user (S202: NO), the authentication print processing is ended.

If, on the other hand, the user is authenticated as the authorized user (S202: YES), the job requesting unit 44 generates the authentication print job request including the user specifying information on the authorized user, and sends the generated authentication print job request to the authentication print job holding server 20 (S203).

Here, if the acquired authentication information includes the user specifying information associated with the authentication print job in the authentication print job holding server 20, the job requesting unit 44 uses the included user specifying information to generate the authentication print job request. On the other hand, if the acquired authentication information does not include such user specifying information (for example, if the authentication print job is associated with the user name of the authorized user by the authentication print job holding server 20 but the acquired authentication information includes the staff number instead of the user name of the authorized user), the job requesting unit 44 refers to a table in which different types of user specifying information corresponding to the same user are associated in advance with each other, acquires the user specifying information used in the authentication print job holding server 20, and generates the authentication print job request by means of the acquired user specifying information. It should be noted that converting the user specifying information may be executed by the authentication print job holding server 20.

When authentication print job providing unit 22 of the authentication print job holding server 20 accepts the authentication job request from the printer apparatus 40 (S204), the authentication print job providing unit 22 extracts the user specifying information from the authentication print job request, and searches for an authentication print job corresponding to the extracted user specifying information with reference to the authentication print job accumulation unit 21 (S205).

When the corresponding authentication print job is found by searching, this authentication print job is read and transmitted to the printer apparatus 40 (S206).

It should be noted that a configuration is possible in which, first, a list of information related to the corresponding authentication print job is created and transmitted to the printer apparatus 40 and the user is caused to use the list of information to select an authentication print job on which the user wishes to perform printing. Moreover, the authentication print job that is completely transmitted to the printer apparatus 40 is desirably deleted from the authentication print job accumulation unit 21 at a predetermined timing (for example, at a timing at which a print completion notification is received from the printer apparatus 40, or after a lapse of a certain time period).

When the receiving unit 41 of the printer apparatus 40 receives the authentication print job transmitted from the authentication print job holding server 20 (S207), the print control unit 42 executes print processing based on this received authentication print job as in the existing technology (S208). Specifically, the authentication print job is analyzed, one band or one page of print image in a raster format is created and stored in an image buffer, a predetermined unit (one pass, for example) of the print image is transferred from the image buffer to the print engine on the basis of a control command of the authentication print job, and printing is executed while controlling the print engine. Hereinafter, the authentication print job that has been subjected to such print processing is referred to as "print execution job."

The collection status determination unit 46 creates a collection status management request that includes the identification information on the print execution job and the user specifying information on the authorized user of the print execution job, and sends the request to the collection status management server 30 (S209).

When the collection status management unit 32 of the collection status management server 30 accepts the collection status management request from the printer apparatus 40 (S300: collection status management request), the collection status management unit 32 extracts the identification information on the print execution job and the user specifying information on the authorized user of the print execution job from the collection status management request, secures a new storage area for the print execution job in the collection status storage unit 31 to register each extracted information, and sets the corresponding collection status to "uncollected" (S301). FIG. 9A shows an example of a data structure of the collection status management unit 32.

Once the print processing based on the print execution job is ended and a printed matter is output in the printer apparatus 40, the re-authentication unit 45 waits for authentication information on the print execution job to be input via the authentication device 100 (S210). At this moment, the state in which authentication print processing related to the print execution job is still continuing may be displayed on the display portion and the like.

When the authentication information can be acquired via the authentication device 100, the re-authentication unit 45 determines based on the authentication information whether a user who inputs the authentication information is the authorized user of the print execution job or not (executes re-authentication processing) (S211). The directory server providing the LDAP authentication service can be used for the re-authentication, as in, for example, the authentication unit 43.

If the user who inputs the authentication information is not the authorized user of the print execution job (S212: NO), the step is returned to S210.

If, on the other hand, the user who inputs the authentication information is the authorized user of the print execution job (if the re-authentication is performed) (S212: YES), it means that the authorized user exists in a print execution place (in the vicinity of the printing apparatus or authentication apparatus) after completion of the print processing, thus the collection status determination unit 46 determines that the printed matter corresponding to the print execution job is collected by the authorized user, notifies the collection status management server 30 of the result of determination (S213), and ends the authentication print processing related to the print execution job.

When the collection status management unit 32 of the collection statue management server 30 accepts the notification from the printer apparatus 40 (S300: printed matter collection notification), the collection status management unit 32 updates the storage contents of the collection status storage unit 31 so that the collection status of the print execution job is changed to "collected" (S302).

Room-Exit Step: FIG. 7

When the user tries to leave the room X, collection status confirmation processing is executed in the following procedures.

First, the user specifying information acquisition unit 51 of the room entry/exit management apparatus 50 acquires the user specifying information from the user who wishes to leave the room X (room-exit user) (S400).

Various configurations can be adopted as the user specifying information acquisition unit 51 according to the design, and, for example, a magnetic reader provide in the vicinity of a door of the room X can be used. In this case, the identification information of the room-exit user (for example, the user name, user ID (staff number etc.) etc.) is read from the ID card or the like that is swiped through the magnetic card reader by the room-exit user, and the read identification information is acquired as the user specifying information.

Next, the room entry/exit control unit 52 creates a collection status confirmation request that includes the user specifying information of the room-exit user, and sends to the collection status management server 30 (S401).

When the collection status management unit 32 of the collection status management server 30 accepts the collection status confirmation request from the room entry/exit management apparatus 50 (S300: collection status confirmation request), the collection status management unit 32 extracts the user specifying information included in the accepted collection status confirmation request, and determines, referring to the collection status storage unit 31, whether a print execution job corresponding to the extracted user specifying information, i.e., an authentication print job regarding which the user specified by the user specifying information executes print processing as the authorized user, is registered or not. If registered, the collection status management unit 32 determines whether the collection status is set to "collected" (S303) and notifies the room entry/exit management apparatus 50 of the result of determination (S304).

Once the room entry/exit control unit 52 accepts the notification from the collection status management server 30, the room entry/exit control unit 52 allows the room-exit user to leave the room on condition that the result of determination indicates that the room-exit user collects the printed matter corresponding to the print execution job regarding which the room-exit user executed print processing as the authorized user (S402).

Specifically, in the case in which the result of determination indicates the print execution job corresponding to the room-exit user is not registered or in the case in which the result of determination indicates, when the print execution job corresponding to the room-exit user is registered, the collection status of the printed matter corresponding to the registered print execution job is set to "collected," the room-exit user is allowed to leave the room, otherwise this user is not allowed to leave the room.

Various embodiments can be considered as the embodiment for allowing/disallowing the user to leave the room, and, for example, as with an existing room entry/exit management system, there can be employed a embodiments in which the door to enter or exit the room X is locked by default in advance, and the door is unclosed once when the user is allowed to leave the room.

According to such a configuration of the present embodiment, the authorized user who performs the print processing based on the authenticated print job in the room X needs to be subjected to authentication again upon completion of the print processing in order to leave the room X, and needs to change the collection status of the printed matter to "collected." Therefore, the authorized user who has performed authentication printing can be strongly reminded, at the time of re-authentication or when leaving the room, that there is a printed matter to be collected, and as a result the authorized user can be prevented from forgetting to collect the printed matter and the confidentiality of the printed matter can be ensured precisely.

Modification of the First Embodiment

The following modification can be considered on the assumption that the authentication unit 43, the re-authentication unit 45 and the user specifying information acquisition unit 51 are configured, in the first embodiment, so as to be capable of writing and reading information to and from a rewritable storage medium, such as an IC card (referred to as "IC card or the like" hereinafter).

When the authentication unit 43 can perform authentication based on authentication information that is read from the IC card or the like possessed by the user, the authentication unit 43 writes "printed matter generated," which is a status related to a print execution job, into the IC card or the like via the authentication device 100.

When the re-authentication unit 45 determines that the printed matter corresponding to the print execution job is collected by the authorized user, the re-authentication unit 45 notifies the collection status management server 30 of such a collection status, and writes "collected" as the status related to the print execution job, into the IC card or the like of the authorized user of the print execution job via the authentication device 100.

When the collection status management unit 32 of the collection status management server 30 accepts the above-mentioned notification from the printer apparatus 40, the collection status management unit 32 updates the storage content of the collection status storage unit 31 so that the collection status of the print execution job is changed to "collected."

In the room-exit state, when the user specifying information acquisition unit 51 of the room entry/exit management apparatus 50 acquires the user specifying information from the room-exit user, the user specifying information acquisition unit 51 attempts to read the status related to the print execution job from the IC card or the like possessed by the room-exit user.

Then, when the user specifying information acquisition unit 51 cannot read the status, "printed matter generated," the room entry/exit control unit 52 allows the room-exit user to leave the room. Also, when the status, "printed matter generated," can be read, the room entry/exit control unit 52 allows the room-exit user to leave the room only when the status, "collected," is read. On the other hand, when the status, "collected," cannot be read although the status, "printed matter generated," can be read, the room-exit user is not allowed to leave the room.

Second Embodiment

The second embodiment employs a configuration for determining the collection status using a code for confirming the collection status (collection confirmation code), instead of determining the collection status by performing or not performing re-authentication. Therefore, the collection status storage unit 31 of the collection status management server 30 stores, for each authentication print job, the user specifying information of the authorized user, the authorized user collection status of the printed matter, the collection confirmation code and the like in association with the identification information of the authentication print job (see FIG. 9B).

Figure 10:
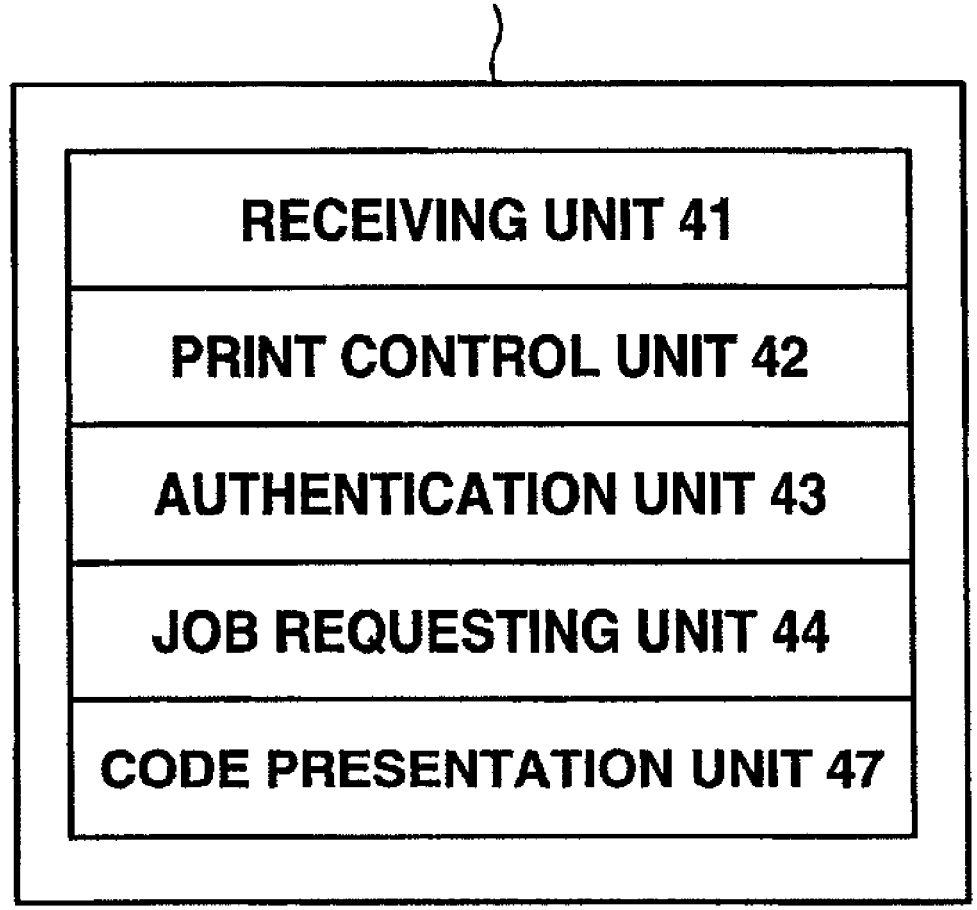
FIG. 10 is a block diagram showing a configuration of an information processing portion of the printer apparatus 40 according to a second embodiment.

Furthermore, the information processing portion of the printer apparatus 40 includes, in place of the re-authentication unit 45 and the collection status determination unit 46, a code presentation unit 47 that creates and presents the collection confirmation code (see FIG. 10).

Figure 11:
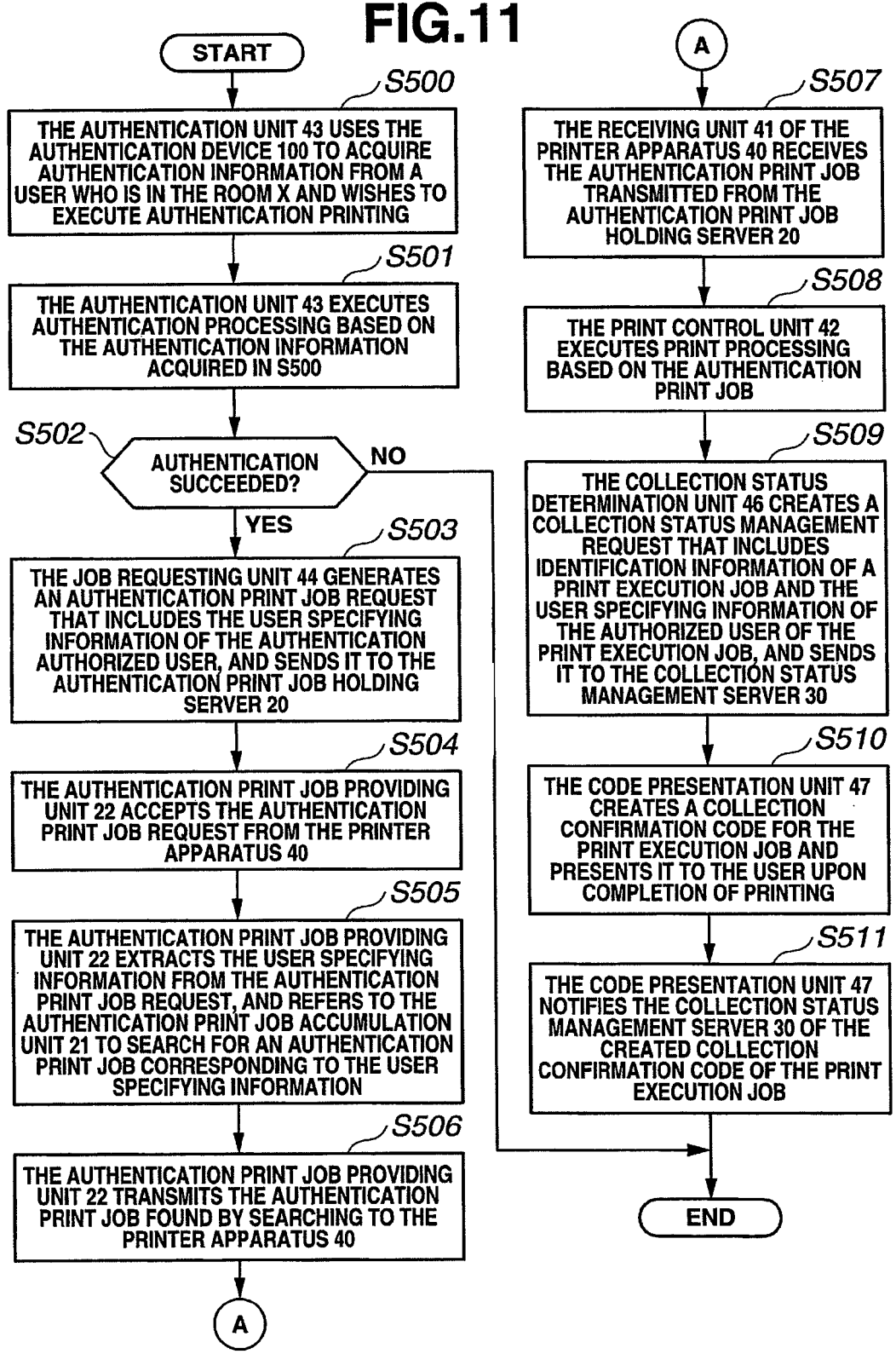
FIG. 11 is a flowchart for explaining the steps of executing authentication printing according to the second embodiment.
Figure 12:
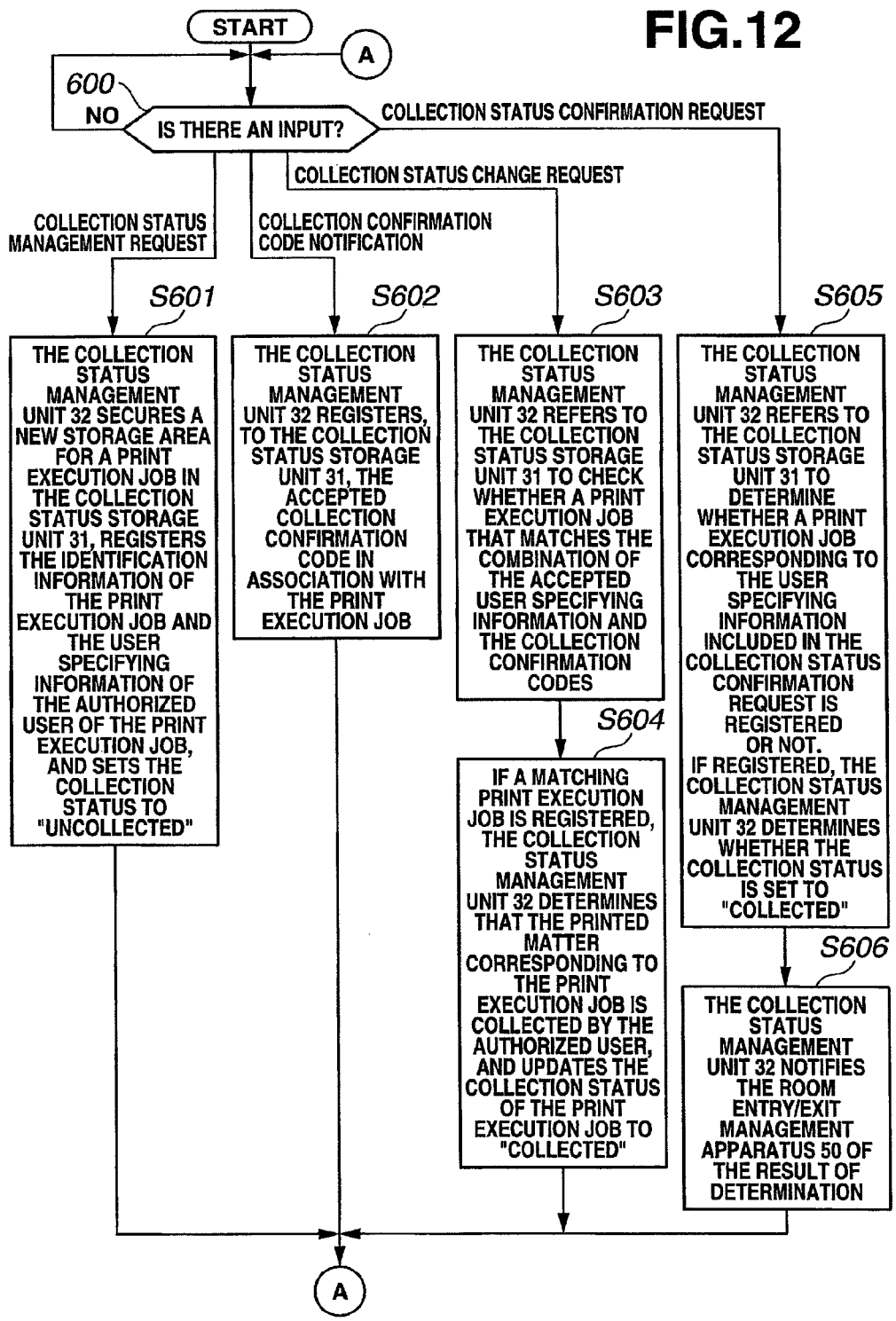
FIG. 12 is a flowchart for explaining the operation of the collection status management server 30 according to the second embodiment.

Hereinafter, the steps of executing authentication printing and the operation of the collection status management server 30 according to the second embodiment are described with reference to FIG. 11 and FIG. 12. It should be noted that the steps of accumulating authentication print jobs and the operation of the room entry/exit apparatus are the same as those of the first embodiment.

Steps of Executing Authentication Printing: FIG. 11

The steps between S500 through S509 are, in principle, executed in the same manner as the steps between S200 through S209 of the first embodiment.

When print processing based on a print execution job is started, the code presentation unit 47 of the printer apparatus 40 creates a collection confirmation code corresponding to the print execution job and presents the collection confirmation code to the user upon completion of printing (S510).

The collection confirmation code can be a combination of, for example, alphabets or numbers, as with a so-called password.

As the method of presentation to the user, it is considered to display the collection confirmation code on a predetermined display portion, such as a display panel of the printer apparatus 40, upon completion of printing, or to control the print control unit 42 to print the collection confirmation code on a blank space of the last page of a printed matter obtained based on the print execution job.

Next, the code presentation unit 47 notifies the collection status management server 30 of the created collection confirmation code of the print execution job (S511). Accordingly, authentication print processing related to the print execution job is ended.

Operation of the Collection Status Management Server 30: FIG. 12

When the collection status management unit 32 of the collection status management server 30 accepts a collection management request from the printer apparatus 40 (S600: collection status management request), the collection status management unit 32 extracts the identification information of the print execution job and the user specifying information of the authorized user corresponding to the print execution job from the collection status management request, secures a new storage area for the print execution job in the collection status storage unit 31 to register each of the extracted information and set the corresponding collection status to "uncollected" (S601).

Also, when the collection status management unit 32 accepts the notification of the collection confirmation code from the printer apparatus 40 (S600: collection confirmation code notification), the collection status management unit 32 registers the accepted collection confirmation code to the collection status storage unit 31 in association with the print execution job (S602).

Moreover, when the collection status management unit 32 accepts a combination of the user specifying information and a collection confirmation code, and a collection status change request via, for example, a personal computer (not shown) that is configured communicably by the collection status management server 30 (S600: collection status change request), the collection status management unit 32 refers to the collection status storage unit 31 to check whether or not a print execution job that matches the combination of the accepted user specifying information and the collection confirmation code is registered (S603).

If the matching print execution job is registered, it means that the authorized user can correctly input the collection confirmation code with respect to the print execution job, and this means that the authorized user exists in the print execution place where the collection confirmation code can be confirmed upon completion of print processing. Therefore, the collection status management unit 32 determines that the printed matter corresponding to this print execution job is collected by the authorized user, and updates the storage content of the collection status storage unit 31 so that the collection status of this print execution job is changed to "collected" (S604).

Furthermore, when the collection status management unit 32 accepts the collection status confirmation request from the room entry/exit management apparatus 50 (S600: collection status confirmation request), the collection status management unit 32 extracts the user specifying information included in the accepted collection status confirmation request, and refers to the collection status storage unit 31 to determine whether a print execution job corresponding to the extracted user specifying information, i.e., an authentication print job regarding which the user specified by the user specifying information executes print processing as the authorized user, is registered or not. If registered, the collection status management unit 32 determines whether the collection status is set to "collected" (S605), and notifies the room entry/exit management apparatus 50 of the result of determination (S606).

According to such a configuration of the present embodiment, the authorized user who performs the print processing based on the authenticated print job in the room X needs to check the presented collection confirmation code upon completion of the print processing in order to leave the room X, and needs to input this collection confirmation code to change the collection status of the printed matter to "collected." Therefore, the authorized user who has performed the print processing based on the authentication print job can be strongly reminded, at the time when checking the collection confirmation code or when leaving the room, that there is a printed matter to be collected, and as a result the authorized user can be prevented from forgetting to collect the printed matter and the confidentiality of the printed matter can be ensured precisely.

Figure 13:
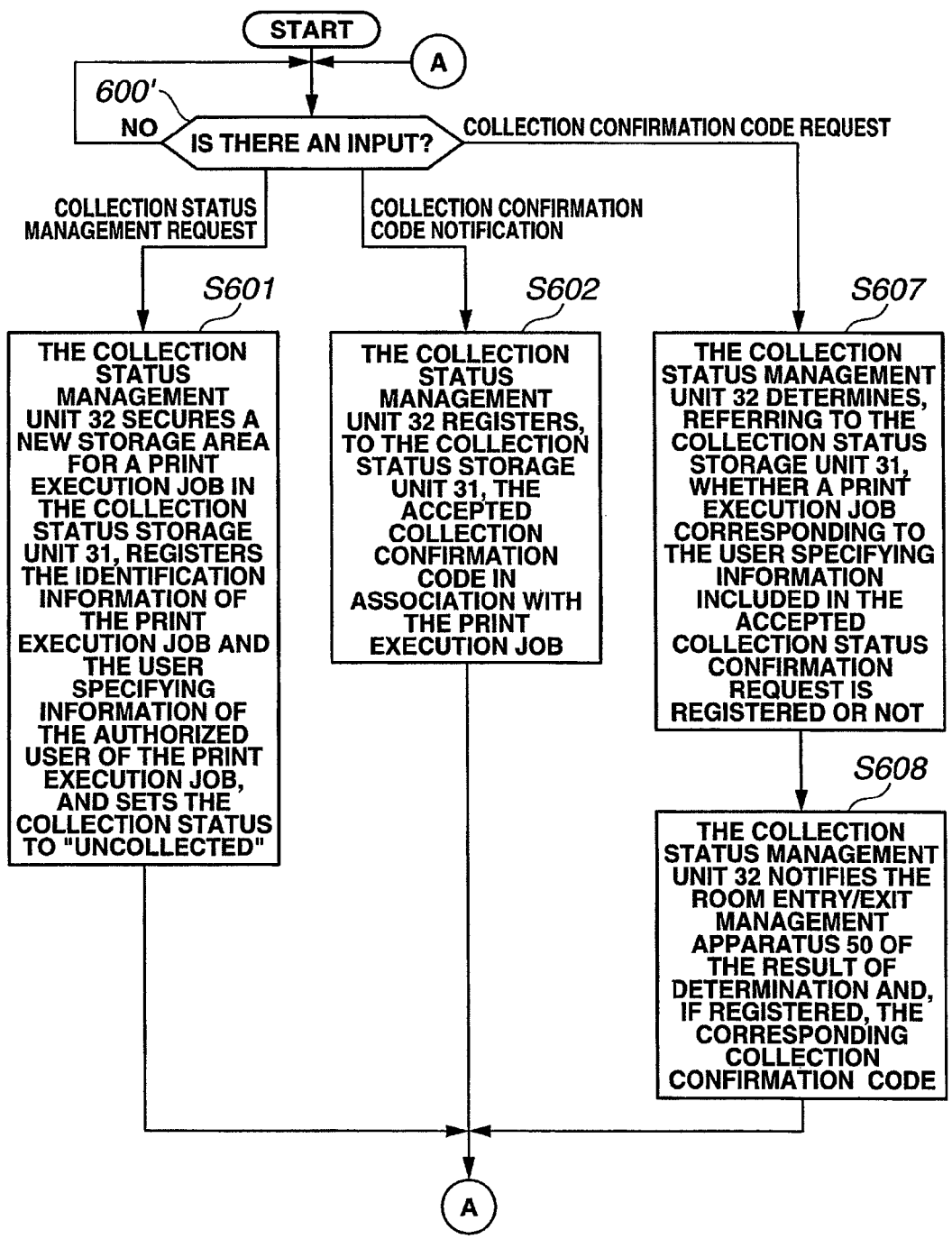
FIG. 13 is a flowchart for explaining the operation of the collection status management server 30 according to a modified example of the second embodiment.

Modification of the Second Embodiment: FIG. 13 and FIG. 14

The second embodiment can be modified such that the collection confirmation code is accepted in the steps of leaving the room. Hereinafter, the steps different from those of the second embodiment are mainly described.

The user specifying information acquisition unit 51 of the room entry/exit management apparatus 50 acquires the user specifying information from the room-exit user (FIG. 14: S700).

Next, the room entry/exit control unit 52 creates a collection confirmation code request that includes the acquired user specifying information of the room-exit user, and sends the collection confirmation code request to the collection status management server 30 (S701).

When the collection status management unit 32 of the collection status management server 30 accepts the collection confirmation code request from the room entry/exit management apparatus 50 (FIG. 13: S600': collection confirmation code request), the collection status management unit 32 extracts the user specifying information included in the accepted collection status confirmation request, and refers to the collection status storage unit 31 to determine whether a print execution job corresponding to the extracted user specifying information, i.e. an authentication print job regarding which the user specified by the user specifying information executes print processing as the authorized user, is registered or not (S607). Then, the collection status management unit 32 notifies the room entry/exit management apparatus 50 of the result of determination and, if registered, corresponding collection confirmation code (S608).

Once the room entry/exit control unit 52 accepts the above-mentioned notification from the collection status management server 30 (S702), when the notification indicates that the corresponding print execution job is not registered (S703: NO), the room entry/exit control unit 52 allows the room-exit user to leave the room (S704).

When, on the other hand, the notification indicates that the corresponding print execution job is registered (S703: YES), the room entry/exit control unit 52 prompts the room-exit user to input code information (S705).

Then, when code information is input by the user, the room entry/exit control unit 52 compares the acquired code information with the accepted collection confirmation code (S706). When both items match with each other, the room entry/exit control unit 52 determines that the printed matter corresponding to this print job is collected by the authorized user, and allows the room-exit user to leave the room (S704). If the items do not match, the room-exit user is not allowed to leave the room (S707).

According to such a configuration of the present modification, the authorized user who performs the print processing based on the authenticated print job in the room X needs to check the presented collection confirmation code upon completion of the print processing and to input the collection confirmation code in the steps of leaving the room, in order to leave the room X. Therefore, the authorized user who has performed the print processing based on the authentication print job can be strongly reminded, at the time when checking the collection confirmation code or when leaving the room, that there is a printed matter to be collected, and as a result the authorized user can be prevented from forgetting to collect the printed matter and the confidentiality of the printed matter can be ensured precisely.

OTHER MODIFICATIONS

The present invention can be modified in various ways and applied without being limited by the above embodiments and modifications. For example, each of the above embodiments describes the authentication printing system having the printer apparatus as a printing apparatus, but the present invention can be applied to an authentication printing system that comprises a printing apparatus, such as a copying machine, a facsimile machine and a complex machine.

Moreover, in each of the above embodiments, the host apparatus 10, the authentication print job holding server 20 and the collection status management server 30 are described as a separate unit, any of them may have a part or the whole of the functions of the other units. Similarly, the printer apparatus 40 may have a part or the whole of the functions of the print job holding server 20 and/or the collection status management server 30. For example, a configuration in which the printer apparatus 40 includes the authentication print job accumulation unit 21 can be considered.

Moreover, for example, the printer driver unit 13 may create, based on an instruction of a job-creating user, an authentication print job that includes information indicating whether collection status management is needed on a printed matter, and the re-authentication unit 45 and the collection status determination unit 46 may be operated in the printer apparatus 40, only regarding an authentication print job which indicates collection status management of the printed matter is needed. Alternatively, a configuration is considered in which the printer driver unit 13 creates, based on an instruction of the job-creating user, an authentication print job that includes information indicating the confidentiality of a printed matter, and the re-authentication unit 45 and the collection status determination unit 46 are operated in the printer apparatus 40, only regarding an authentication print job whose confidentiality of printed matter is at a certain level or higher.

For example, the collection status management server 30 may be configured to perform management on not only whether a printed matter is collected but also the progress of the print processing (unexecuted print processing, print processing that is being executed, completion of print processing), and the room entry/exit control unit 52 may be configured to allow the room-exit user to leave the room, on condition that there is no authentication print job, out of the authentication print jobs corresponding to the room-exit user, that is being subjected to print processing. In this case, it is considered that the authentication print job holding server 20 create a progress management request during a step in which an authentication print job is received, and send the request to the collection status management server 30.

Moreover, in the first embodiment, the re-authentication unit 45 is configured to wait until authentication is completed for a print execution job. In other words, the re-authentication unit 45 is configured such that print processing based on another authentication print job is not executed until the abovementioned print execution job is subjected to re-authentication. However, print processing and the like based on another authentication print job may be executed without waiting for a success of authentication performed by the re-authentication unit 45.

Furthermore, for example, the collection status management server 30 may be configured to manage a state in which corresponding data is registered in the collection status storage unit 31, as "printed matter uncollected," and to manage a state in which the data is not registered, as "printed matter collected." In this case, when it is determined that a printed matter corresponding to a print execution job is collected, the collection status management unit 32 of the collection status management server 30 deletes the data related to this print execution job from the collection status storage unit 31.

Moreover, for example, in the modification of the first embodiment, print processing based on an authentication print job may be executed only when an IC card or the like is set in the authentication device 100.

What is claimed is:

1. An authentication printing system, comprising:
   an authentication unit that acquires authentication information from a user and authenticates the user as an authorized user based on the authentication information that the user possesses the authority to execute authentication printing;
   a printing unit that acquires a print job corresponding to the authorized user from a printing job holding unit for storing the print job in association with the authorized user, and executes the authentication printing based on the print job;
   a re-authentication unit that acquires the authentication information from the user upon completion of print processing, with regard to an executed print job, and authenticates based on the authentication information that the user is the authorized user of the executed print job; and
   a collection status determination unit that determines that a printed matter is collected by the authorized user with regard to the executed print job, when authentication is completed by the re-authentication unit with regard to the executed print job.

2. The authentication printing system according to claim 1, further comprising:
   a room exit control unit that gives room exit permission to a room-exit user, who wishes to exit from a room in which a printing apparatus for executing the authentication printing and an apparatus for acquiring the authentication information are set up, on condition that a determination is made that the printed matter, which is obtained as a result of the executed print job regarding which the room-exit user possesses the authority to execute authentication printing, is collected.

3. The authentication printing system according to claim 2, wherein when the collection status determination unit determines that the printed matter obtained as a result of the executed print job is collected, the collection status determination unit writes a status indicating printed matter collection into a storage medium for the authorized user of the executed print job, and the room exit control unit permits the room-exit user to exit from the room when the room exit control unit reads the status indicating printed matter collection from the storage medium for the room-exit user.

4. An authentication printing system, comprising:

an authentication unit that acquires authentication information from a user and authenticates the user as an authorized user based on the authentication information that the user possesses the authority to execute authentication printing;

a printing unit that acquires a print job corresponding to the authorized user from a printing job holding unit for storing the print job in association with the authorized user, to execute an authentication printing based on the print job;

a code presentation unit that creates a collection confirmation code for performing collection confirmation with respect to the print job that is subjected to the authentication printing, and presents the collection confirmation code upon completion of the printing; and a collection status determination unit that acquires code information from the user and, when the acquired code information matches the collection confirmation code of the print job that is subjected to the authentication printing by the authorized user, determines that a printed matter corresponding to the print job is collected by the authorized user.

5. The authentication printing system according to claim 4, further comprising:

a room exit control unit that gives room exit permission to a room-exit user, who wishes to exit from a room in which a printing apparatus for executing the authentication printing and an apparatus for acquiring the authentication information are set up, on condition that a determination is made that the printed matter, which is obtained as a result of the print job subjected to the authentication printing by the room-exit user as the authorized user, is collected.

6. The authentication printing system according to claim 4, wherein the code presentation unit includes a unit that displays the collection confirmation code on a predetermined display portion upon completion of printing, or a unit that prints the collection confirmation code on a last page of the printed matter.

7. An authentication printing method, comprising:

an authentication step of acquiring authentication information from a user and authenticating the user as an authorized user based on the authentication information that the user possesses the authority to execute authentication printing;

a printing step of acquiring a print job corresponding to the authorized user from a printing job holding unit for storing the print job in association with the authorized user, and executing the authentication printing based on the print job;

a re-authentication step of acquiring the authentication information from the user upon completion of print processing, with regard to an executed print job, and authenticating based on the authentication information that the user is the authorized user of the executed print job; and a collection status determination step of determining that a printed matter is collected by the authorized user with regard to the executed print job, when authentication is completed as a result of authentication executed in the re-authentication step with regard to the executed print job, wherein at least one of the authentication step, the printing step, the re-authentication step, and the collection status determination step is performed by a computer.

8. An authentication printing method, comprising:

an authentication step of acquiring authentication information from a user and authenticating the user as an authorized user based on the authentication information that the user possesses the authority to execute authentication printing;

a printing step of acquiring a print job corresponding to the authorized user from a printing job holding unit for storing the print job in association with the authorized user, and executing the authentication printing based on the print job;

a code presentation step of creating a collection confirmation code for performing collection confirmation with respect to the print job that is subjected to the authentication printing, and presenting the collection confirmation code upon completion of the printing; and a collection status determination step of acquiring code information from the user and, when the acquired code information matches the collection confirmation code of the print job that is subjected to the authentication printing by the authorized user, determining that a printed matter corresponding to the print job is collected by the authorized user, wherein at least one of the authentication step, the printing step, the code presentation step, and the collection status determination step is performed by a computer.

9. A program, stored on a non-transitory medium, which program when executed by a computer causes the computer to execute the authentication printing method according to claim 7 or 8.

* * * * *